United States Patent [19]
Appius et al.

[11] 3,882,947
[45] May 13, 1975

[54] PORTABLE JEWELER'S BALANCE

[75] Inventors: Max Karl Appius, Berneck, Switzerland; Adolf Ast, Messtetten, Germany

[73] Assignee: Mettler Instrumente AG, Greifensee-Zurich, Switzerland

[22] Filed: Feb. 11, 1974

[21] Appl. No.: 441,672

[30] Foreign Application Priority Data
June 15, 1973 Switzerland.......................... 8687/73

[52] U.S. Cl................. 177/246; 177/178; 177/171; 177/238
[51] Int. Cl............................................... G01g 23/32
[58] Field of Search.......................... 177/164–172, 177/177, 178, 190–199, 238, 246, 264; D52/10 R

[56] References Cited
UNITED STATES PATENTS

| | | | |
|---|---|---|---|
| 2,690,906 | 10/1954 | Seyter.................... | 177/192 |
| 2,993,547 | 7/1961 | Richardson............ | 177/196 |
| 3,032,132 | 5/1962 | Ohaus..................... | 177/171 |
| 3,035,649 | 5/1962 | Williams................ | 177/178 |
| 3,101,803 | 8/1963 | Kleinman............... | 177/238 |
| 3,189,111 | 6/1965 | Ast.......................... | 177/178 |
| 3,661,222 | 5/1972 | Weickhardt............ | 177/178 |
| D219,712 | 1/1971 | Fleming................. | D52/10 R |

*Primary Examiner*—Richard B. Wilkinson
*Assistant Examiner*—Vit W. Miska
*Attorney, Agent, or Firm*—Hans Berman

[57] ABSTRACT

The operating elements of a portable, top-loading inclination balance are mostly mounted in a housing from which a pan carrier and the weighing pan project. The weight of an object on the pan is projected on a screen visible from outside the housing. A cover pivoted to the housing may be swung wide for access to the weighing pan, swung closer to the housing into an intermediate position for protecting the pan against the influence of air movement, or swung into a closed position in which it envelops the pan carrier and pan. The light source of the projecting system is energized only in the intermediate cover position, and the balance beam and pan carrier assembly are lifted from associated knife edge bearings and clamped against the housing or against the cover in response to movement of the cover into the closed position in which it is locked by a manually releasable latch. The weighing range of the balance is expanded by substitution weights which may be suspended either from the pan carrier or from pins on the housing immediately adjacent the projection screen and carry marks indicative of their weight.

10 Claims, 4 Drawing Figures

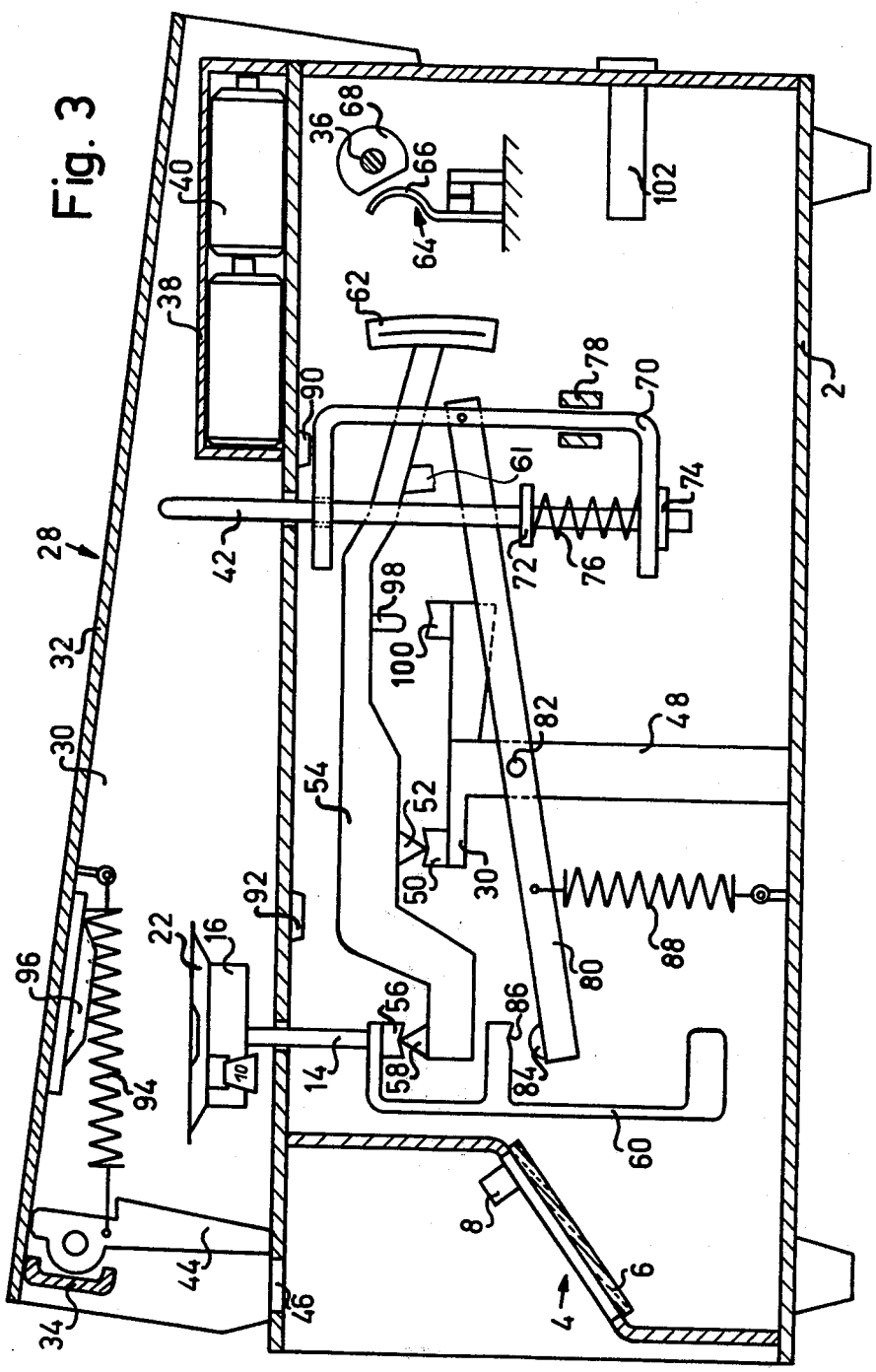

PORTABLE JEWELER'S BALANCE

This invention relates to inclination balances, and particularly to an inclination balance of high precision which may be carried about safely without damage to its sensitive parts.

Balances of the type described are frequently required by jewelers and dealers in precious stones. The required degree of accuracy of the weighings is such that the pressure of an air current against the weighing pan may produce a significant error. Housings for enveloping the pan during the weighing operation have been used successfully in stationary, laboratory-type balances, but they are not suitable for a portable balance. The known jeweler's balances equipped with wind shields do not simultaneously satisfy requirements for high accuracy, ready portability, convenient operation over a relatively wide range of weights, simplicity of construction, and ruggedness.

It is a primary object of this invention to provide an inclination balance which meets all the afore-enumerated requirements. More specifically, the invention aims at an inclination balance equipped with a screen from which the weight of an object on the weighing pan may be read directly, and which is capable of an expanded weighing range by the provision of substitution weights that can be read conveniently in conjunction with the projected weight indication on a projection screen.

With these and other objects in view, the invention, in its more specific aspects, provides a top-loading inclination balance whose balance beam is normally fulcrumed on a main bearing in the balance housing. An outer bearing on one arm of the beam pivotally supports a pan carrier assembly which partly projects outward of the housing in an upward direction in the normal operating condition of the balance and carries a weighing pan.

A cover is pivotally mounted on the housing for movement in an arcuate path toward and away from a closed position in which it envelops the weighing pan and the projecting portion of the carrier assembly. When the cover is remote from the closed position, it provides access to the weighing pan. A screen set into the housing so as to be visible from the outside of the housing may carry an image of a portion of a graduated scale on the balance beam. A balance weight carrying a mark representative of its weight may be secured alternatively to the projecting portion of the pan carrier assembly or to the housing adjacent the projection screen for simultaneous viewing of its mark with the weight indicia projected on the screen.

Other features, additional objects, and many of the attendant advantages of this invention will readily be appreciated as the same becomes better understood by reference to the following detailed description of a preferred embodiment when considered in connection with the appended drawing in which:

FIG. 3 is a fragmentary, side-elevational, sectional view of the balance; and

Figure 1:
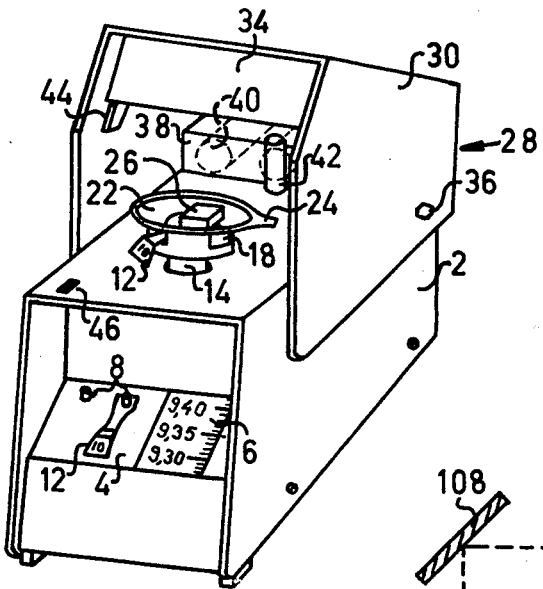
FIG. 1 shows a jeweler's balance of the invention in a perspective view in its operative condition.

Referring initially to FIG. 1, there is seen a portable, top-loading jeweler's inclination balance whose operating elements are mounted on and in a housing 2. The front end of the housing 2 is recessed, and an obliquely sloping wall 4 in the recess has a window closed by a ground glass screen 6. The projected image of a weight scale calibrated in metric carats (c.) is seen on the screen 6.

Two pins 8 project from the wall 4 adjacent the screen 6. A balance weight 12 is suspended from one of the pins 8 in FIG. 1. The weight is a strip of sheet metal whose two ends taper toward the center. One of the ends is provided with an opening through which the pin 8 passes. An index mark 10 is stamped into the other end to indicate that the weight weighs 10 carats (2 g).

The stem 14 of a pan carrier 16 passes movably through the top wall of the casing 2. The pan carrier 16 has the shape of a low, cylindrical cup whose radial bottom is attached to the stem 14. Its circular rim has two notches 18 wide enough to receive the narrow central part of either of two weights 12, 12' which differ in thickness, but are identical in all other dimensions. The second balance weight 12' which carries the index mark 20 and weighs 4 g is inserted in one of the notches 18. A weighing pan 22 rests on the rim of the carrier 16. The pan 22 is a watch glass provided with an integral lug 24 and carries a gem stone 26 which it is desired to weigh.

Figure 2:
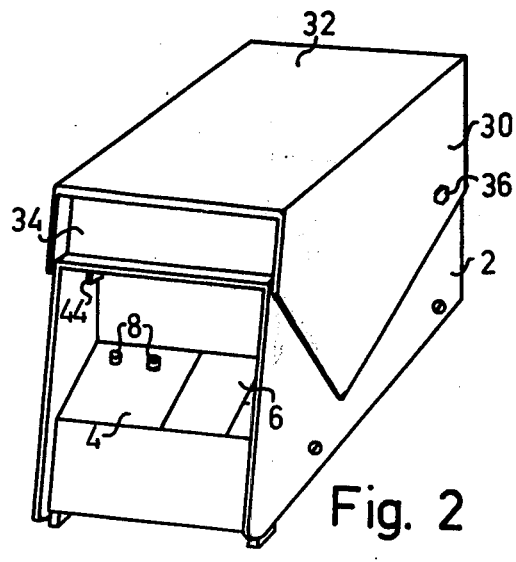
FIG. 2 illustrates the balance of FIG. 1 in the closed condition.

The pan 22 and associated elements may be protected against draft by a cover 28 mainly consisting of two side walls 30, a top wall 32, better seen in FIG. 2, and a short front wall 34. The two ends of a shaft 36 are fastened to the side walls 30 near their rear ends. The shaft 36 is journaled in the housing 2 with sufficient friction to hold the cover in any angular position against the force of gravity which tends to move the cover toward the closed position shown in FIG. 2 in which the front wall 34 rests on the top wall of the housing 2.

A battery casing 38 fastened atop the housing 2 behind the pan carrier 16 holds dry cell batteries 40 for the projector lamp of the balance. The battery casing 38 seals the space under the cover 28 in a rearward direction when the cover is in the closed position. A locking pin 42 projects upward from the housing 2 near the battery casing 38 for engagement by the top wall 32 when the cover is closed. A latch 44 attached to the cover 28 behind the front wall 34 can enter an opening 46 in the top wall of the housing 2 when the cover 28 pivots toward the closed position.

FIG. 3 shows the balance in side-elevational section. Most of the electrical and optical devices of the balance, conventional in themselves, have been omitted from FIG. 3 for aa clearer representation of the mechanical features.

A column 48 in the housing 2 carries the bearing plate 50 for the main-bearing knife edge 52 on the balance beam 54. The bottom end of the stem 14 carries the plate 56 for the outer-bearing knife edge 58 on one arm of the beam 54. An approximately E-shaped metal member 60 is fixedly attached to the stem 14 and depends from the same to keep it upright/

The other arm of the balance beam 54, which is free of elements projecting from the housing 2, carries a counterweight 61, partly omitted from FIG. 3 in order not to obscure novel structure, and a transparent, graduated scale 62 which is arcuate about the main bearing axis. An image of a portion of the scale 62 is projected on the ground glass screen 6 in a manner not shown in FIG. 3 by an electric light bulb that may be energized by the dry-cell batteries 40 when a switch 64 is closed. The movable contact of the switch is mounted on the housing 2 by means of a leaf spring 66 which tends to close the switch. A radial cam 68 on the shaft 36 releases the spring 66 only when the top walls of the housing 2 and of the cover 28 define an angle of approximately 12° to 70°, but opens the switch 64 when the cover 28 is nearer the closed position shown in FIG. 2 or so wide open that the side walls 30 no longer protect the pan carrier 16 against moving air.

The locking pin 42 passes freely through the two normally horizontal, vertically spaced leg portions of a U-shaped metal bar 70, but two washers 72, 74 fixed on the pin 42 and a helical compression spring 76 wound about the pin 42 between the washer 72 and one leg of the bar 70 normally couple the pin 42 to the bar 70 for joint vertical movement, the bar 70 being guided between two projections 78 on the housing 2.

A first arm of a lever 80 is loosely hinged to the bar 70. The fulcrum of the lever 80 is a pivot pin 82 on the column 48, and its second arm carries a spherically arcuate abutment 84 of elastomeric material spacedly opposite the central branch 86 of the E-shaped metal member 60. A helical tension spring 88 interposed between the second lever arm and the housing 2 biases the abutment 84 away from the branch 86, and biases the locking pin 42 upward and outward of the housing 2. The upward movement of the bar 70 is limited by a resilient bumper 90. A similar bumper 92 is arranged above the main bearing 50, 52 on the housing 2.

The latch 44 is pivoted on the cover 28 and biased counterclockwise, as viewed in FIG. 3, by a helical tension spring 94. When the cover 28 is being lowered, the latch 44 abuts against the top wall of the housing 2, and the cover may be closed fully after the latch is pivoted manually to pass through the opening 46 into the recessed front space of the housing 2. When it is desired to open the cover 28, the hook-shaped free end of the latch 44 is pulled forward until it can pass through the opening 46. A frustoconical bumper 96 on the top wall 32 engages the weighing pan 22 during the closing movement of the cover. A pin 98 depends from the beam 54 between the main bearing 50, 52 and the scale 62 toward a resilient abutment 100 on the column 48.

A jack 102 in the rear wall of the housing 2 permits insertion of the plug of an A.C. converter, as will presently be described with reference to FIG. 4.

Figure 4:
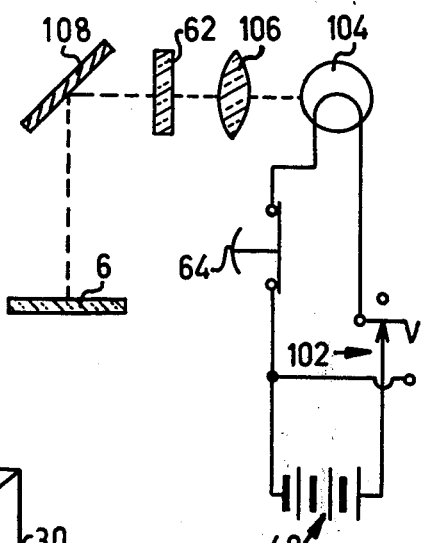
FIG. 4 shows the electrical and optical elements of the balance in a conventional manner.

The electrical and optical elements of the balance mounted in the housing 2 and omitted from FIG. 3 are illustrated in FIG. 4 largely by conventional symblols. The two poles of the battery constituted by the dry-cell elements 40 are connected to the filament of a projector lamp 104 through the switch 64 and through normally closed contacts of the jack 102. The lamp circuit is closed by the switch 64 only when the cover 28 is in an angular position between 12° and 70° relative to the normally horizontal top wall of the housing 2. When a mating plug of an A.C. converter (not shown) is inserted in the jack 102, the battery circuit is interrupted at the jack, and the low-voltage output of a transformer in the A.C. converter is connected to the lamp 104 through the switch 64.

A condenser lens 106 directs the light of the lamp 104 to the scale 62, and light transmitted by the scale is reflected on the screen 6 by a set of mirrors represented in FIG. 4 by a single mirror 108.

The closed balance is normally stored in a non-illustrated, fitting case equipped with a handle for convenient transportation. For use, the balance is withdrawn from the case and placed on a surface which ist at least approximately horizontal. Its position may be precisely adjusted in a conventional manner by means of threadedly mounted legs and a spirit level on the housing 2, neither the legs nor the level being shown since they are old in this art and not directly relevant to the invention.

The cover 28 then is fully opened by swinging it about the axis of the shaft 36 from the position seen in FIG. 2 through an arc of about 90°. The switch 64 is closed only briefly during movement of the cover 28 which gives free access to the pan 22. Both weights 12, 12' are normally stored in the notches 18 of the pan carrier 16 in the manner shown in FIG. 1. The balance has a weighing range of 10 c. for full deflection of the scale 32. If the object to be weighed is heavier than 10 c., the balance range may be shifted up to a maximum of 40 c. by manually removing one or both weights 12, 12' after lifting the pan 22 which normally prevents escape of the weights. It is preferred to suspend the removed weight or weights from the pins 8 in such a manner that the weight-indicating imprint on the removed weight is visible next to the reading provided by the projected image on the screen 6 and a fixed index mark on the screen. When the object to be weighed has been placed on the pan 22, the cover is lowered, preferably until the latch 44 abuts against the housing 2, as is shown in FIG. 3, so that the cover 28 protects the pan 22 against draft while the lamp 104 is energized either by the battery of cells 40 or by the non-illustrated A.C. adapter. The cover 28 is raised after a reading has been taken so as to permit convenient removal of the load from the pan 22.

When the cover thereafter is lowered to the position illustrated in FIG. 3, and further after the latch 44 has been guided manually into the opening 46, the locking 42 is depressed by the top wall 32 of the cover 28. The upper leg portion of the bar 70, coupled to the pin 42 by the spring 76, engages the adjacent arm of the beam 54 and depresses the engaged arm until the pin 98 engages the abutment 100 on the fixed column 48. Simultaneously, the lever 80 is pivoted clockwise, as viewed in FIG. 3, so that the abutment 84 engages the branch 86 of the E-shaped member 60 and raises the latter. The bearing plate 56 is lifted from the knife edge 58. During further upward movement of the member 60, the branch 86 engages the adjacent arm of the beam 54 and pivots the beam about the engaged pin 98 and abutment 100 until the main bearing 50, 52 is disengaged, and the beam 54 rests against the bumper 92. After the latch 44 has passed through the opening 46, as is shown in FIG. 2, the bumper 96 holds the pan 22 in position, thereby securing the weights 12, 12' in the notches 18. The movable balance elements in the housing 2 are immobilized under the resilient force exerted by the spring 76 which is compressed during the downward movement of the pin 42 after the lever 80 is stopped by the beam 54 engaging the bumper 92. The balance may now be returned to its case and safely transported without damage to its sensitive elements.

When the closed balance is placed on a table top or other approximately horizontal surface, and the cover 28 is swung open, all other movable elements are returned to the operative position shown in FIG. 3 by gravity and the several springs. The only step that may be required prior to a weighing resides in the removal of one or both substitution weights 12, 12' from the pan carrier assembly, as described above.

The batteries 9 are protected against discharge while the balance is closed, but also during the loading of the weighting pan 22 while the cover is swung upward to a position not specifically shown in the drawing in which it provides most ready access to the pan 22. If the balance is operated with household current through a conventional adapter essentially consisting of a step-down transformer, the switch 64 significantly extends the useful life of the projector lamp 104.

What is claimed is:

1. A top-loading inclination balance comprising, in combination:
   a. a housing;
   b. a main bearing in said housing;
   c. a balance beam normally fulcrumed on said main bearing and having two arms in said housing;
   d. a pan carrier assembly;
   e. an outer bearing on one of said arms pivotally supporting said assembly, a portion of said assembly movably passing outward of said housing in an upward direction when said balance is in the normal operating condition;
   f. a weighing pan on said portion of said assembly outside said housing;
   g. a cover pivotally mounted on said housing for movement in an arcuate path toward and away from a closed position in which said cover envelops said weighing pan and said portion of said assembly, said cover, when remote from said position, providing access to said weighing pan;
   h. a locking member projecting from said housing into said path for engagement with said cover when the cover moves toward said position and for movement inward of said cover in response to further movement of said cover toward said position;
   i. motion transmitting means in said housing connecting said locking member to said beam and to said assembly for disengaging said main bearing and said outer bearing in response to said inward movement of said locking member, and for securing said beam and said assembly in a fixed position relative to said housing;
   k. a balance weight carrying a mark representative of the weight thereof; and
   l. securing means on said portion of said assembly and on said housing for alternatively securing said balance weight to said assembly and to said housing.

2. A balance as set forth in claim 1, further comprising a graduated scale on said beam, a screen set into said housing and visible from the outside of said housing, and projector means in said housing for projecting an image of a portion of said scale on said screen, said securing means including means for securing said balance weight to said housing adjacent said screen.

3. A balance as set forth in claim 1, further comprising a counterweight on the other arm of said balance beam in said housing, said other arm being free of elements extending outward of said housing.

4. A balance as set forth in claim 2, further comprising engaging means on said cover abuttingly engaging said weighing pan in said position of said cover.

5. A balance as set forth in claim 2, further comprising latching means for securing said cover in said position thereof, said latching means including a latch member on said cover remote from the axis of curvature of said path, said latch member projecting from said cover toward said housing and abuttingly engaging said housing during said movement of the cover toward said position and thereby preventing the cover from reaching said position, the housing being formed with an opening, said latch member being manually movable on said cover toward and away from a position of alignment with said opening, biasing means biasing said latch member away from said position of alignment, whereby said latch member may be manually aligned with said opening, and said cover moved into said position thereof while the aligned latch member is being received in said opening.

6. A balance as set forth in claim 2, wherein said projector means include a source of electric current, a projector lamp, switch means in series circuit with said lamp and said source for connecting said lamp to said source and for disconnecting the lamp from said source, and switch operating means for operating said switch means in response to said movement of said cover.

7. A balance as set forth in claim 3, wherein said portion of the pan carrier assembly is formed with a recess dimensioned for receiving said balance weight, said weighing pan being superposed on said pan carrier assembly for manual removal when said cover is away from said position thereon, the superposed pan partly closing said recess and securing a balance weight received in said recess to said assembly, thereby constituting an element of said securing means.

8. A balance as set forth in claim 7, wherein said portion of the pan carrier assembly is cup-shaped and has a free rim, said recess being a notch in said rim, and said superposed weighing pan engaging said rim over substantially the entire circumference thereof and outwardly closing said notch.

9. A balance as set forth in claim 5, wherein said latch member has a projection transverse to the direction of said alignment, and said projection lockingly engages said housing under the force of said biasing means in said position of said cover, said housing being formed with a recess giving access to said projection for manual movement of the received latch member against the restraint of said biasing means, whereby the latch member may be released manually from locking engagement with said housing, and said cover thereafter moved away from said position thereof.

10. A balance as set forth in claim 6, a jack operatively interposed between said source and said lamp, and responsive to insertion of a plug for disconnecting said lamp from said source and for conductively connecting the lamp to the inserted plug.

* * * * *